United States Patent
Liu

(10) Patent No.: US 11,671,933 B2
(45) Date of Patent: Jun. 6, 2023

(54) RANDOM-ACCESS ENDPOINT COMMUNICATION HANDLING FOR SATELLITE-TRANSPORTED COMMUNICATION LINKS

(71) Applicant: Lockheed Martin Corporation, Bethesda, MD (US)

(72) Inventor: Xiangdong Liu, Boyds, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 285 days.

(21) Appl. No.: 17/176,611

(22) Filed: Feb. 16, 2021

(65) Prior Publication Data

US 2022/0264502 A1    Aug. 18, 2022

(51) Int. Cl.
*H04W 74/08* (2009.01)
*H04W 56/00* (2009.01)
(Continued)

(52) U.S. Cl.
CPC ....... *H04W 56/0055* (2013.01); *H04W 16/26* (2013.01); *H04W 24/08* (2013.01); *H04W 56/004* (2013.01); *H04W 74/0833* (2013.01)

(58) Field of Classification Search
CPC ........... H04W 56/0055; H04W 56/004; H04W 74/0833; H04W 74/004; H04W 16/26; H04W 24/08
See application file for complete search history.

(56) References Cited

U.S. PATENT DOCUMENTS 10,547,374 B1    1/2020 Liu
2007/0147229 A1    6/2007 Geile et al.
(Continued)

FOREIGN PATENT DOCUMENTS

WO    2020/031120 A2    2/2020
WO    2020/191759 A1    10/2020

OTHER PUBLICATIONS

EventHelix.com, "5G Standalone Access: Registration Procedure," 7 pages, Feb. 13, 2019.
(Continued)

*Primary Examiner* — Hassan Kizou
*Assistant Examiner* — Hector Reyes

(57) ABSTRACT

Provided herein are various improvements to communication systems and satellite-carried communications. In one example, a method provides communication coverage for at least an endpoint device within a cell. The method includes detecting access preamble communications transferred by the endpoint device during a random access slot of a base station by at least applying a selected quantity of successive sets of processing windows in accordance with a round-trip minimum communication delay expected between the base station and the cell, with each of the successive sets shifted in time by a selected duration. The method also includes determining a round-trip differential communication delay for the endpoint device based on which of the successive sets corresponds to detection of symbol groups of the access preamble communications, and handling return communications transferred by the endpoint device based at least on a combination of the round-trip minimum communication delay and the round-trip differential communication delay.

20 Claims, 7 Drawing Sheets

(51) Int. Cl.
*H04W 24/08* (2009.01)
*H04W 16/26* (2009.01)

(56) References Cited

U.S. PATENT DOCUMENTS

| | | | |
|---|---|---|---|
| 2017/0223743 A1 | 8/2017 | Lin et al. | |
| 2017/0324587 A1 | 11/2017 | Lin et al. | |
| 2018/0241464 A1 | 8/2018 | Michaels | |
| 2019/0394806 A1 | 12/2019 | Niu et al. | |
| 2020/0314943 A1 | 10/2020 | Kim et al. | |
| 2021/0168872 A1* | 6/2021 | Qi | H04W 74/0833 |
| 2021/0251012 A1* | 8/2021 | Shrestha | H04W 72/23 |
| 2021/0282193 A1* | 9/2021 | Chen | H04W 74/0833 |
| 2022/0104271 A1* | 3/2022 | Cao | H04W 74/002 |
| 2022/0150972 A1* | 5/2022 | Turtinen | H04B 7/18558 |

OTHER PUBLICATIONS

EventHelix.com Inc., "LTE Random Access Procedure," 5 pages, 2015.

Jiang, Nan et al., "RACH Preamble Repetition in NB-IoT Network," IEEE Communications Letters, vol. 22, Iss. 6, 4 pages, Jun. 2018.

Lin, Xingqin et al., "Random Access Preamble Design and Detection for 3GPP Narrowband IoT Systems," IEEE Wireless Communication Letters, 4 pages, May 17, 2016.

RF Wireless World, "NB IoT Tutorial—Features, Spectrum, Applications of NB IoT," 6 pages, 2012.

International Application No. PCT/US2022/016477, International Search Report, Written Opinion, 9 pages, dated May 11, 2022.

\* cited by examiner

EXAMPLE NB-IoT OVER SATELLITE NPRACH FORMAT PARAMETERS (all durations and delays in msec)

610 →

| Format | Preamble Duration | Repetitions | Guard Period | NPRACH Window | Max Diff Delay | Max 1-way Diff Distance (km) | Number Proc Windows |
|---|---|---|---|---|---|---|---|
| 0-1-6 | 5.6 | 1 | 0.4 | 6 | 0.2 | 60 | 6 |
| 0-1-7 | 5.6 | 1 | 1.4 | 7 | 0.7 | 210 | 21 |
| 0-1-10 | 5.6 | 1 | 4.4 | 10 | 2.2 | 660 | 66 |
| 1-1-7 | 6.4 | 1 | 0.6 | 7 | 0.3 | 90 | 3 |
| 1-1-8 | 6.4 | 1 | 1.6 | 8 | 0.8 | 240 | 6 |
| 1-1-10 | 6.4 | 1 | 3.6 | 10 | 1.8 | 540 | 14 |
| 1-1-15 | 6.4 | 1 | 8.6 | 15 | 4.3 | 1290 | 33 |
| 1-1-20 | 6.4 | 1 | 13.6 | 20 | 6.8 | 2040 | 51 |
| 1-4-40 | 6.4 | 4 | 14.4 | 40 | 7.2 | 2160 | 54 |
| 2-1-20 | 19.2 | 1 | 0.8 | 20 | 0.4 | 120 | 1 |
| 2-1-21 | 19.2 | 1 | 1.8 | 21 | 0.9 | 270 | 3 |
| 2-1-32 | 19.2 | 1 | 12.8 | 32 | 6.4 | 1920 | 16 |
| 2-2-52 | 19.2 | 2 | 13.6 | 52 | 6.8 | 2040 | 17 |

620 →

| Beam diameter (deg) | Max differential distance (km) | Max 1-way differential delay (msec) |
|---|---|---|
| 0.6 | 1270 | 4.23 |
| 0.8 | 1570 | 5.23 |
| 1.0 | 1800 | 6.00 |

FIGURE 6

RANDOM-ACCESS ENDPOINT COMMUNICATION HANDLING FOR SATELLITE-TRANSPORTED COMMUNICATION LINKS

TECHNICAL BACKGROUND

Terrestrial cellular and mobile wireless technologies have been increasingly deployed over orbital satellite systems, which can increase coverage options for terrestrial base stations. For example, mobile wireless protocols, such as Long-Term Evolution (LTE), can be deployed using orbital satellite devices as repeaters or for transporting terrestrial signals over longer distances than can be normally achieved with only terrestrial base stations. In this manner, a wireless access point, referred to as an Evolved Node B (eNB or eNodeB) in LTE, might transmit signals to an orbital satellite device which establishes cells on the terrestrial surface which are located some distance away from the wireless access point. This can provide wireless communication services to terrestrial or airborne endpoint devices, often referred to as User Equipment (UE), which have line of sight to an orbital satellite device but lack such arrangements with terrestrial eNBs.

In addition to LTE protocols, many other mobile wireless protocols have been developed by standards organizations such as the 3rd Generation Partnership Project (3GPP), including third generation wireless protocols, fourth generation wireless protocols (such as LTE), and fifth generation protocols which include revisions to LTE and are referred to generally as 5G. One such protocol is the Narrow Band Internet-of-Things (NB-IoT) protocol which was developed based on LTE technology and applied to narrow band transmissions and low-power devices which are deployed in various telemetry, asset tracking, and sensing scenarios. These type of devices fall under the umbrella term "Internet-of-Things" (IoT) devices which evoke a distributed network of small, low-power, devices coupled to various other devices. NB-IoT typically operates on 200 kilohertz (kHz) carriers and provides several uplink bandwidths, such as 180, 90, 45, 15, and 3.75 kHz, for endpoint devices depending upon device capability and needs. NB-IoT specifically targets communication services to a large number of low-power, low-duty cycle, and low-cost devices. However, it can be challenging to provide adequate wireless service to IoT devices which might have more limited transmission capabilities or be deployed in remote/inaccessible areas, such as where terrestrial base stations might have difficulty establishing sufficient signal levels.

NB-IoT devices, among other types of protocols, perform an initial handshaking process to initiate devices onto the wireless network in preparation for data transfer. This handshaking establishes detection of nearby access points, time synchronization of signaling, and exchange of various authorization, administrative, and accounting signaling which allows devices to successfully communicate through a selected access point. However, when orbital satellite repeaters or extended distances between access points and endpoint devices are encountered, existing protocol sequences and handshaking processes can fail to detect transmissions from endpoint devices as well as fail to establish timing and synchronization between such elements. Therefore, deployment of orbital satellite repeaters for wireless networks has been limited to certain niche applications which may require expensive and complex modification of associated equipment.

OVERVIEW

Discussed herein are various techniques for enhancing aspects of Low Power Wide Area (LPWA) networks and systems, such as Narrow Band Internet-of-Things (NB-IoT) communications over satellite-transported links. Normally terrestrial in nature, NB-IoT and other similar protocols, can be transported by orbital satellite devices which might be positioned in geosynchronous orbits (GEO). In terrestrial NB-IoT, endpoint devices can access resources of a communication system using a random-access process in which synchronization communications are exchanged before user data transfer occurs. However, NB-IoT is designed to work in a cell with a maximum radius of approximately 120 km due to maximum communication delay allowed by the protocol, among other factors. When orbital satellite devices are employed as repeaters, much larger transmission delays are experienced, both from the length of a communication link carried from ground to satellite to ground, but also from the variation in location of endpoint devices across a potentially large cell. For example, a cell formed on the terrestrial surface by a satellite beam might have a differential distance, that is, distance variation, of 1800 kilometers (km) for a GEO communications satellite with a 1-degree beam size. Acquisition processes that determine delays between endpoint devices and base stations can fail in such scenarios. The examples herein provide for return direction acquisition of endpoint device signaling, and achieve time synchronization with a base station in a return direction to overcome a large differential communication delay within a cell.

In one example, a method includes providing communication coverage for at least an endpoint device within a cell. The method includes detecting access preamble communications transferred by the endpoint device during a random access slot of a base station by at least applying a selected quantity of successive sets of processing windows in accordance with a round-trip minimum communication delay expected between the base station and the cell, with each of the successive sets shifted in time by a selected duration. The method also includes determining a round-trip differential communication delay for the endpoint device based on which of the successive sets corresponds to detection of symbol groups of the access preamble communications, and handling return communications transferred by the endpoint device based at least on a combination of the round-trip minimum communication delay and the round-trip differential communication delay.

In another example, a base station for a cellular communication system includes a transceiver configured to provide communication coverage for at least an endpoint device within a cell. A processor of the base station is configured to detect access preamble communications transferred by the endpoint device during a random access slot of the base station by at least applying a selected quantity of successive sets of processing windows in accordance with a round-trip minimum communication delay expected between the base station and the cell, with each of the successive sets shifted in time by a selected duration. The processor is configured to determine a round-trip differential communication delay for the endpoint device based on which of the successive sets corresponds to detection of symbol groups of the access preamble communications. The transceiver is configured to handle return communications transferred by the endpoint device based at least on a combination of the round-trip minimum communication delay and the round-trip differential communication delay.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 6 illustrates example access parameters for satellite-transported communication configurations.

DETAILED DESCRIPTION

Figure 1:
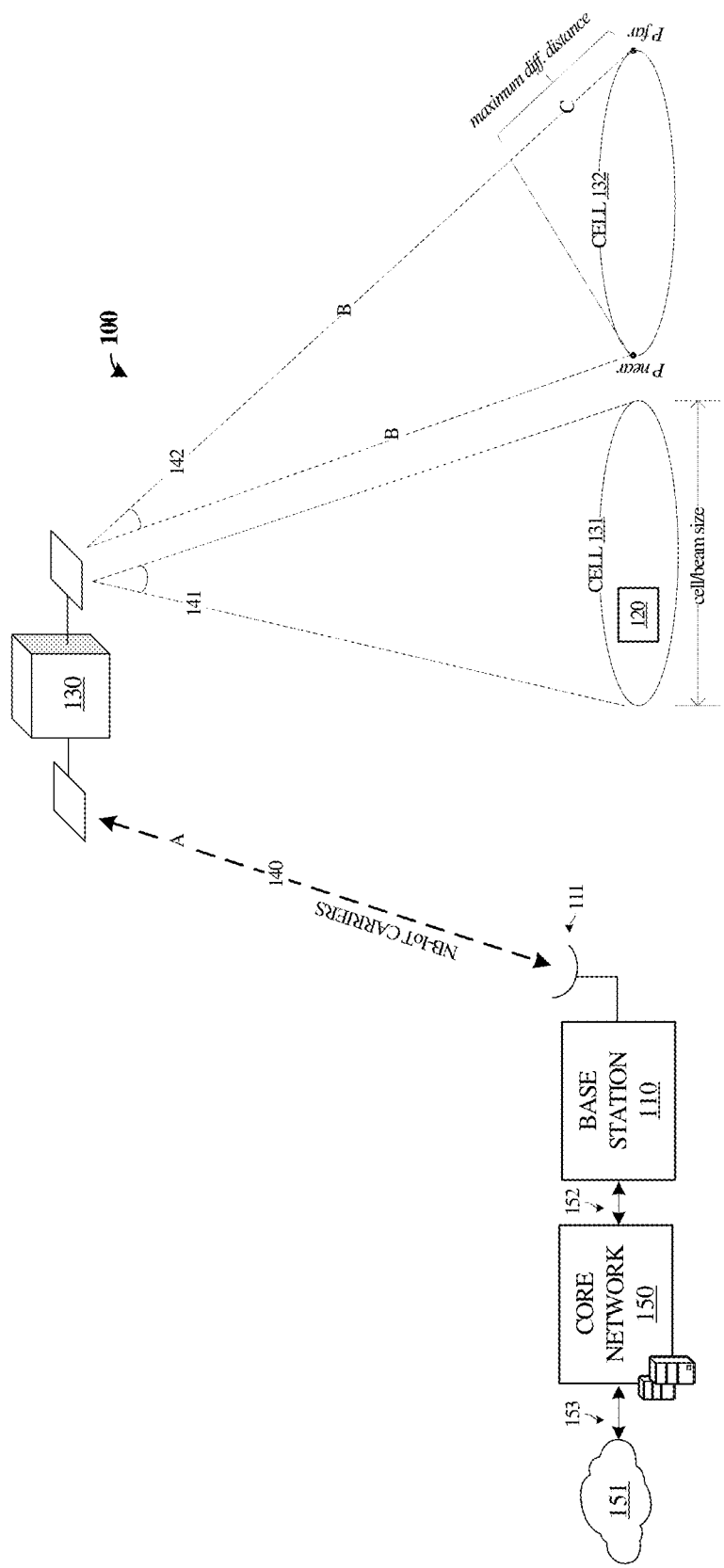
FIG. 1 illustrates a communication system in an implementation.

Wireless communication systems can employ various terrestrial wireless technologies to provide mobile communication coverage to endpoint devices over large geographic regions which are broken into individual coverage cells. In addition, orbital satellite systems have been increasingly employed to expand the coverage and versatility of terrestrial-only networks. To provide communication services to endpoint devices, various wireless communication protocols have been developed, which continue to evolve. These protocols define physical layers that encompass the radio transmission aspects of a wireless link, such as link establishment and maintenance over a particular transmission medium. In wireless technologies, the physical layer can include various frequency and bandwidth arrangements as well as carrier multiplexing, bit-level encoding, and beamforming. Example wireless protocols include 4G Long-Term Evolution (LTE), 5G New Radio (5G NR), 4G or 5G Narrow Band Internet-of-Things (NB-IoT), 4G LTE-M, 5G enhanced Machine Type Communication (eMTC), and 5G New Radio Reduced Capability (NR-RedCap), among others, which employ radio frequency (RF) links and share some similarities at the physical layer.

A cellular/wireless access point, often referred to as a base station, can provide communication links to endpoint devices within a terrestrial coverage cell. Interconnected arrangements of many base stations can thus provide communication connectivity services over large geographic regions. For any given geographical location, multiple cells may be deployed to accommodate a high volume of traffic. In cellular technology and for certain frequency division duplexing (FDD) techniques, a cell can include two paired carriers, one downlink (also referred to as forward link) and one uplink (also referred to as return link), to provide bidirectional communication services for endpoint devices. A base station might provide communication links to endpoint devices by way of one or more orbital satellite devices which act as a type of repeater for the communication links. Using communication links received from base stations, these orbital satellite devices form one or more transmission beams that impinge on the terrestrial surface and form coverage cells. For example, with LTE-over-satellite or NB-IoT-over-satellite technology, multiple cells may be deployed in the same satellite beam. When deployed in geosynchronous orbits (GEO) or low-earth orbits (LEO), orbital satellite devices can advantageously add coverage of cellular networks to remote geographic regions or provide dedicated coverage to meet specific needs of specialized endpoint devices.

NB-IoT has a particular endpoint access routine which endpoint devices use to access communication resources for data transfer with base stations. This access routine includes synchronization communications that are initially exchanged between endpoint devices and base stations before the base station grants endpoint devices resources for data transfer. However, NB-IoT is designed to work in a cell with a maximum radius of approximately 120 km, with propagation delays between endpoint devices and base stations to be no more than 0.4 milliseconds. When orbital satellite devices are employed as communication repeaters, much larger propagation delays are experienced, both from the length of a communication link carried from ground to satellite to ground, but also from the variation in location of endpoint devices across any particular cell/beam dimension. For example, a cell formed on the terrestrial surface by a satellite beam might have a differential distance variation across the cell of 1800 kilometers (km) for a GEO communications satellite with a 1-degree beam size, which far exceeds the 120 km size of cells supported by the NB-IoT protocol. Synchronization communications that determine delays between endpoint devices and base stations can fail in such scenarios where communication link delays are too great. The examples herein provide for detection and estimation of endpoint device signaling to allow an endpoint device to achieve time synchronization with a base station and overcome large round-trip minimum and differential communication delays within a cell.

Various terminology is employed herein for convenience and clarity in description. However, it should be understood that the selected terminology can refer to other terms which are employed across various wireless protocols and architectures. For example, the term endpoint device can refer to any device or node that originates and transmits uplink communications to a base station. Endpoint devices can be referred to as user equipment (UE), user devices, terminals, access terminals, mobile handsets, or IoT endpoints, endpoints, among other designations. The term base station can refer to any device or node that transmits downlink communications to endpoint devices within one or more cells. A base station can be referred to as a wireless access node, ground station, an evolved node B (eNode B or eNB), next generation node B (ng-eNB), or gNB, among other designations. Orbital satellite devices can be referred to as satellites, communication satellites, orbital platforms, orbital repeaters, orbital relays, satellite repeaters, satellite relays, satellite transponders, among other designations. When a cellular system employs satellite repeaters, it can be referred to as a mobile satellite service (MSS) system. Additionally, although NB-IoT protocols and architectures are discussed in the examples herein, it should be understood that similar enhanced concepts and techniques can be applied to LTE, 5G, eMTC, and other protocols and architectures. While NB-IoT uses a single carrier frequency division multiple access (SC-FDMA) communication scheme in the uplink, the techniques discussed herein can be applied to other communication schemes, such as orthogonal frequency-division multiplexing (OFDM), orthogonal frequency-division multiple access (OFDMA), code division multiple access (CDMA), frequency division multiple access (FDMA), or time division multiple access (TDMA). SC-FDMA is also referred to as linearly pre-coded OFDMA.

We turn now to a discussion of NB-IoT link acquisition processes which are performed between base stations and endpoint devices. An acquisition process comprises random access request communications which include a determination of communication delays between endpoint devices and base stations. The communication delays are dependent upon the distance separating the endpoint devices and the base station as well as the signal propagation speed, typically the speed of light (c=299,792,458 m/s). Thus, a transmission delay corresponds to the separation distance divided by the speed of light. A transmission delay is approximately zero milliseconds for an endpoint device positioned next to a base station. Delay for any other endpoint device location can be regarded as a differential communication delay relative to a zero millisecond delay, the differential communication delay being greater than or equal to zero milliseconds.

NB-IoT systems can employ a random-access procedure to let endpoint devices time synchronize to the system in uplink. NB-IoT devices support a narrower frequency spectrum of bandwidth than LTE, namely 180 kHz transmission bandwidth in 200 kHz channels. After this time synchronization process with a base station, the endpoint devices can transmit signals to the base station such that the signals arrive at the base station at time instances expected by the base station without interfering the transmissions by other endpoint devices. In the random-access procedure of a terrestrial NB-IoT terrestrial wireless system, an endpoint device transmits a narrowband physical random-access channel (NPRACH) preamble comprising Symbol Groups (SGs) or a series of such NPRACH preambles (repetition) to a base station. NPRACH uses a single tone frequency hopped SG sequence, which differs from some techniques used in LTE, and can save transmit power required in endpoint devices. Endpoint device transmitted NPRACH preambles, also called random access preambles, arrive at the base station with various time offsets relative to base station timing (frames and subframes) due to propagation delays of the endpoint devices. The base station detects the NPRACH preamble or series of preambles transmitted by an endpoint device and determines the propagation delay to the endpoint device and then notifies the endpoint device of the propagation delay. The endpoint device adjusts its subsequent transmissions to the base station by that propagation delay and thus the transmissions arrive at the base station at time instances expected by the base station, while staying clear in time of transmissions by other endpoint devices.

However, when satellite links are employed to transport NPRACH communications, such as over a mobile satellite service (MSS) system, associated random access preambles can arrive at base stations with much larger time offsets relative to base station timing due to large propagation delays. The examples herein apply enhanced NPRACH detection and estimation algorithms which iterate over a series of successive sets of detection/estimation processing windows, until a $K^{th}$ set that yields a detection. Advantageously, native NB-IoT RACH detection and estimation algorithms can be directly leveraged for over-satellite use. RACH burst sequence formats are employed according to the NB-IoT standard, and no hardware or software changes are needed on endpoint devices. This enhanced detection and estimation algorithm can be employed to determine communication/propagation delays on a per-beam/per-cell basis.

With satellite-transported NB-IoT signals, two propagation delays are relevant. A first propagation delay comprises an endpoint device-independent propagation delay (when transported by an orbital satellite device) to the cell in which endpoint devices are located. This per-cell propagation delay, also referred to a round-trip minimum communication delay or minimum propagation delay, may correspond to approximately 240 to 260 milliseconds for GEO satellite devices. Per-cell minimum communication delays can be pre-calculated based upon base station location, satellite ephemeris, and relative geometry of cells to the satellite. A second propagation delay comprises a variable delay which depends upon the actual location of an endpoint device within a cell. This variable delay is referred to as a differential propagation delay or differential communication delay. On a per-cell basis, a duration of NPRACH slot is configured to accommodate the largest possible differential communication delay of the cell. Thus, endpoint devices communicating through satellite devices will transmit NPRACH preambles the same as terrestrial NB-IoT. To detect and determine differential communication delays, a base station employs an enhanced NPRACH detection and estimation algorithm on a per-beam basis that iterates a native NB-IoT NPRACH detection and estimation algorithm. This differential communication delay will be dependent on the location of the endpoint devices in the cells, and can vary an additional 0 to 6+ milliseconds.

There are several advantages of providing LTE (or NB-IoT) service over an MSS system with a 3GPP compliant radio access network (RAN) using a full LTE stack and narrowband carriers. These include seamless support for evolved packet system (EPS)-based services with fine-tuned QoS differentiation, feasibility to operate with limited endpoint link spectrum and to tailor the allocation of that spectrum to uneven traffic demand across different beams, and reuse of terrestrial LTE products and parts to lower development and operational costs. Some communications systems might instead employ Global Navigation Satellite System (GNSS) elements in both the base station and endpoint devices to determine relative distances and empirically measure communication delays. However, these added GNSS elements increase the complexity of the hardware and software elements of an endpoint device, reduce battery life, as well as increase the costs and jamming susceptibility. In the examples herein, a control loop is added outside of the native NB-IoT RACH detection and estimation algorithm to process the received frequency hopping SG burst sequence of satellite-coupled endpoint devices and determine extended transmission delays encountered by link-distant endpoint devices, without need for GNSS components at endpoint devices.

FIG. 1 is presented as a first example implementation of a communication system that employs an enhanced detection and estimation algorithm. FIG. 1 includes communication system 100 which comprises base station 110, endpoint device 120, satellite device 130, cells 131-132, core network 150, and packet network 151. Base station 110 includes transceiver elements 111 which communicate over link 140 with satellite device 130. Satellite device 130 transports these communication links to form cells 131-132 using wireless links/beams 141-142. Each of link 140 and beams 141-142 comprise NB-IoT carriers for providing NB-IoT communication services to endpoint devices, such as example endpoint device 120. These communication services can be further provided by elements of core network 150 coupled to base station 110 over link 152. Core network 150 can provide various higher-layer services, such as authentication, authorization, and accounting (AAA) services, endpoint roaming services, and TCP/IP traffic management and handling that routes traffic to/from other endpoints or communication nodes coupled by packet network 151 over link 153.

Typically, base station 110 and cells 131-132, along with endpoint device 120 are surface-based or terrestrial in nature, while satellite device 130 is deployed into an orbital configuration above the surface of the Earth (or other corresponding body). Endpoint device 120 can be mobile and may be airborne in some examples. Satellite device 130 can be deployed into any number of suitable orbital configurations, such as GEO or LEO, and acts as a repeater to transport communications sourced by base station 110 and endpoint device 120. Thus, satellite device 130 can comprise a "bent pipe" style of communications transponder, where communications are not decoded or demodulated, and instead are merely received, amplified, and translated to a transmit frequency before being directed toward the terrestrial surface. Satellite device 130 does not typically modify communications content and only provides for re-transmission. Satellite device 130 forms a plurality of coverage cells on the terrestrial surface using a plurality of corresponding signal beams. These beams carry signals which are received by endpoint devices seeking to establish communication synchronization with base station 110. As will be discussed below in FIG. 2, enhanced detection and estimation techniques are employed by at least base station 110. Before these techniques are discussed, a brief discussion of the composition of elements of FIG. 1 is provided.

Base station 110 provides wireless links for wireless access to the communication services of a communication network including core network 150. Base station 110 comprises radio frequency (RF) communication and control circuitry, transceivers, and antennas, as well as baseband communications equipment capable of communicating with and providing wireless communication access within wireless coverage areas (cells) for wireless communication devices, such as endpoint devices in cells 131-132. The cells may be physically subdivided into sectors or beams, or have logical subdivisions that correspond to sectors or beams. The RF communication and control circuitry typically include amplifiers, filters, RF modulators, transceivers, signal processing circuitry, upconverters, and downconverters. Base station 110 can also comprise other elements included in base transceiver stations (BTS), E-UTRAN Node B equipment, eNodeB equipment, Evolved Node B equipment, Evolved Universal Terrestrial Radio Access (E-UTRA) network equipment. One or more portions of base station 110 might be included in satellite device 130.

Endpoint device 120 comprises antennas, transceiver circuitry elements, and communication elements. The transceiver circuitry typically includes RF amplifiers, filters, modulators, and signal processing circuitry. Endpoint device 120 can also include data processors, data processing circuitry, user interface systems, memory devices, non-transitory computer-readable storage media, software, power systems, battery systems, sensors, sensing systems, asset trackers, radio frequency identifier (RFID) scanners, or other components. Endpoint device 120 can be an IoT device, telemetry devices, sensor devices, subscriber equipment, customer equipment, access terminal, smartphone, telephone, mobile wireless telephone, computer, mobile Internet appliance, wireless network interface card, media player, game console, or some other wireless communication apparatus, including combinations thereof.

Satellite device 130 comprises an orbital satellite device configured to maintain an orbital configuration above the surface of a central body. Satellite device 130 can include various orbital maintenance and adjustment equipment, navigation equipment, attitude adjustment equipment, propulsion elements, thermal management equipment, various power generation systems, and ground command/control interfaces. Satellite device 130 also includes communication retransmission equipment to perform repeater or transponder functions for cellular signaling. Satellite device 130 might comprise multiple antenna arrays, transceiver equipment, frequency alteration equipment, amplifier equipment, antenna aiming equipment, and beamforming equipment. In some examples, satellite device 130 can include communication processing equipment to regenerate communication signaling before transmission. Satellite device 130 might comprise one or more portions of base station 110.

Core network 150 comprises various elements of a cellular and mobile wireless communication network. Core network 150 includes equipment to provide wireless access to communication services within different coverage areas to endpoint devices, route communications between content providers and endpoint devices, and facilitate endpoint handoffs between equipment of different coverage areas, among other operations. Core network 150 can include evolved UMTS Terrestrial Radio Access Network (E-UTRAN) elements, Evolved Packet Core (EPC) elements, Home Subscriber Servers (HSS), Home Location Registers (HLR), Packet Data Networks (PDN) Gateways (P-GW), Packet Data Switching Nodes (PDSN), Mobility Management Entities (MME), Policy Control And Charging Rules Function (PCRF) elements, Authentication, Authorization, And Accounting (AAA) elements, Mobile Switching Center (MSC) Equipment, Radio Node Controllers (RNC), Home Agents (HA), Mobility Access Gateways (MAG), Diameter nodes, or RADIUS nodes, along with various traffic routers, gateways, switches, and other traffic handling elements.

Packet network 151 comprises equipment and systems to route packet communications between nodes over at least communication link 153 using network communication protocols, such as Ethernet or TCP/IP. Packet network 151 can comprise routers, switches, gateways, bridges, as well as various network links. Packet network 151 can comprise one or more packet networks, local area networks, wide area networks, metropolitan area networks, wireless communication systems, wireless networks, or cellular voice and data networks, among other networks and systems, including combinations thereof.

Wireless links 140-142 can each use the air or space as the transport media. Wireless links 140-142 each comprise one or more wireless communication links signaling that have a particular set of signal parameters that may include center frequency, carrier frequencies, bandwidth, power settings, channels, channel sets, frequency sets, or frequency spread, among others. Wireless links 140-142 can each comprise a wireless link conforming to various protocols and architectures such as 3GPP-defined protocols, among other protocols and architectures. Although these protocols may include Narrow Band Internet-of-Things (NB-IoT), it should be understood that other protocols and communication types can incorporate similar techniques as those discussed herein. These other protocols and communication types can include Long Term Evolution (LTE), LTE Advanced, 5G NR (5G New Radio), 4G, 5G, Code Division Multiple Access (CDMA), Evolution-Data Optimized (EVDO), single-carrier radio transmission technology link (1×RTT), Global System for Mobile Communication (GSM), Universal Mobile Telecommunications System (UMTS), High Speed Packet Access (HSPA), Radio Link Protocol (RLP), Worldwide Interoperability for Microwave Access (WiMAX), Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), IEEE 802.11, Wireless Fidelity (Wi-Fi), or some other cellular or wireless communication format, including combinations, evolutions, improvements, or variations thereof.

Some implementations of the feeder link portion of wireless link 140 (signaling to satellite device 130 from base station 110) may utilize a different carrier configuration to communicate with satellite device 130, and satellite device 130 performs one or more transponder operations to alter the carrier configuration to be compatible with a user link or service link configuration expected by endpoint devices. For example, the feeder link portion of wireless link 140 can employ a frequency range corresponding to the Institute of Electrical and Electronics Engineers (IEEE) bands of S band, L band, C band, X band, Ku band, Ka band, V band, W band, among others, including combinations thereof. Other example RF frequency ranges and service types include ultra-high frequency (UHF), super high frequency (SHF), extremely high frequency (EHF), or other parameters defined by different organizations. Alternatively, optical communications can be employed, and these optical communications typically include optically-relevant carrier frequencies and modulations according to various optical communication standards.

Although one main pathway for each of wireless links 140-142 is shown in FIG. 1, it should be understood that wireless links 140-142 are merely illustrative to show communication modes or wireless access pathways for various endpoints. Communication links 140-142 can each include many different signals sharing the same associated link, as represented by the associated lines in FIG. 1, comprising uplinks (also referred to as return links), downlinks (also referred to as forward links), resource blocks, access channels, beacons, paging channels, notification channels, user communications, communication sessions, overhead communications, carrier frequencies, other channels, timeslots, spreading codes, transportation ports, logical transportation links, network sockets, packets, or communication directions.

Communication links 152-153 use metal, glass, optical, air, space, or some other material as the transport media. Communication links 152-153 can use various communication protocols, such as Transmission Control Protocol/Internet Protocol (TCP/IP), Ethernet, Time Division Multiplex (TDM), asynchronous transfer mode (ATM), synchronous optical networking (SONET), hybrid fiber-coax (HFC), circuit-switched, communication signaling, wireless communications, or some other communication format, including combinations, improvements, or variations thereof. Communication links 152-153 can be a direct link or can include intermediate networks, systems, or devices, and can include a logical network link transported over multiple physical links.

Figure 2:
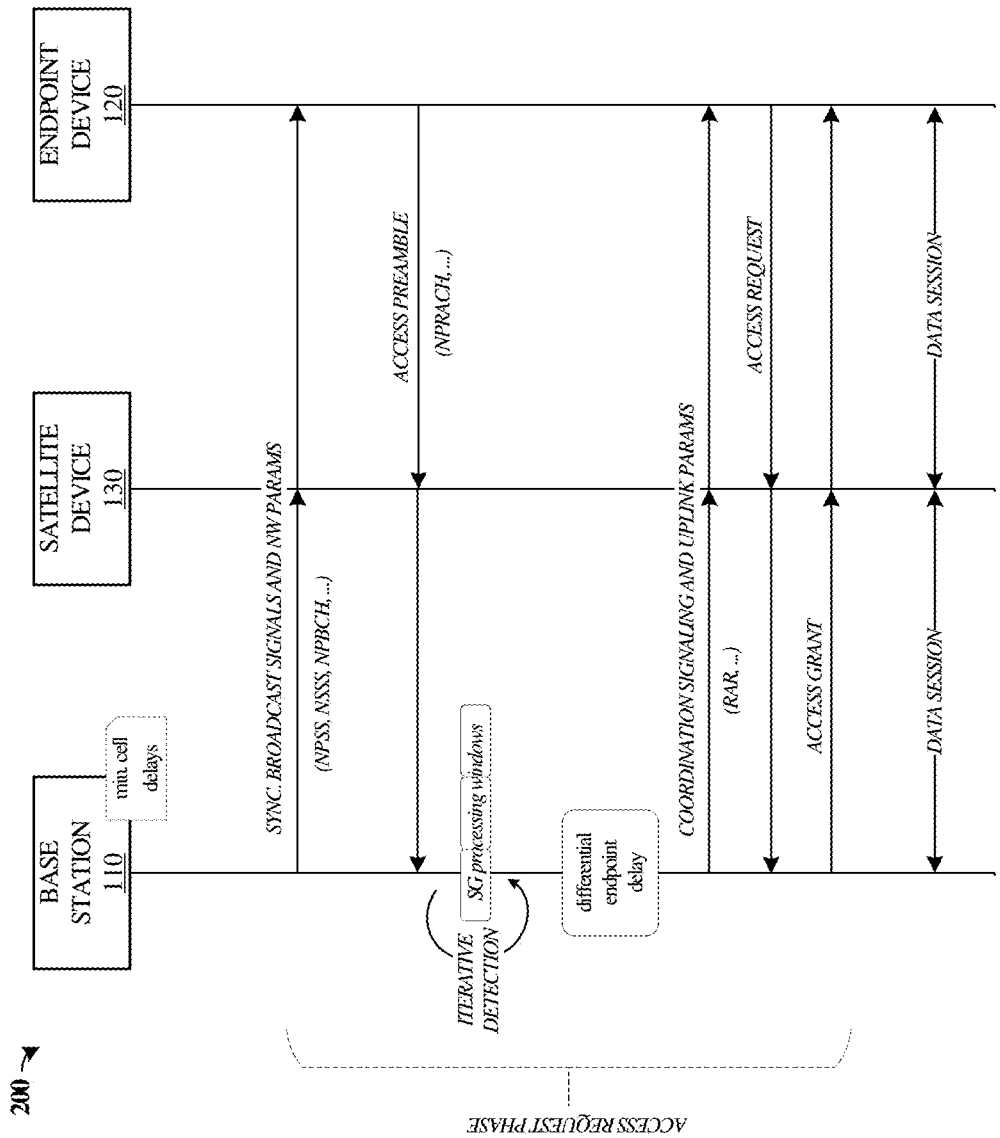
FIG. 2 illustrates example operations for a communication system in an implementation.

FIG. 2 illustrates example operations for communication system 100 in an implementation. The operations of FIG. 2 are discussed in the context of elements of FIG. 1, and focus primarily on the random-access preamble detection portions of NB-IoT communications transferred during synchronization phases of communications between base station 110 and endpoint device 120. Moreover, communications are transferred over satellite device 130 which provides cells 131-132 via beams associated with communication links 141-142. The communication content associated with communication links 141-142 and cells 131-132 originates from base station 110, and is transferred by base station 110 over link 140 to satellite device 130. To properly communicate with endpoint devices within distant cells, base station 110 is advantageously configured to compensate for delays arising from minimum communication delays to the distant cells as well as for present locations of endpoint devices within those distant cells. Base station 110 determines minimum communication delays associated with each cell 131 or 132, and later determines differential communication delays associated with locations of endpoint devices within cells (discussed below) to support random access of the endpoint devices.

First, the minimum communication delay expected between a cell and base station 110 is determined. Base station 110 might determine the minimum communication delay based on precomputed link distances between base station 110 and satellite 130 and between satellite 130 and cells provided by satellite device 130. Within each cell 131 or 132, the geometry of the cell and the satellite 130 is such that there is always a point in the cell that is the closest to satellite 130. In FIG. 1, example geometric comparisons are included for cell 132. Specifically, portions of beam 142 that forms cell 132 have legs 'B' with similar measurements, while link 140 has measurement 'A'. Measurement 'C' for cell 132 corresponds to the maximum differential distance of an endpoint device. Similar geometric concepts can apply to cell 131. $P_{near}$ represents a location within cell 132 having a minimum communication delay for base station 110 when communicating with an endpoint device, while $P_{far}$ represents a location within cell 132 having a maximum communication delay. The minimum communication delay for each cell (e.g. at $P_{near}$ for the cell) can be precomputed based upon base station location, satellite ephemeris, and satellite-cell geometry. Base station 110 adjusts its timing for detection for each cell of random-access request signaling from endpoint devices by the amount of per-cell minimum communication delays such that NPRACH preambles of endpoint devices positioned in a cell at the minimum link delay (e.g. shortest link distance) will arrive at the beginning of a NPRACH slot (that is, of the correct frame and subframe). Receipt timing at base station 110 for different cells is typically not aligned. This compensation for minimum communication delay is similar to but greater than terrestrial deployments where there is appreciable delay between base station antennas and base station baseband equipment. Per-cell minimum communication delay itself may vary over time due to satellite motion relative to the surface and the need for fixed beams impinging on the same underlying areas of the terrestrial surface. Minimum communication delay compensation may thus be updated once very few seconds to every few minutes. An alternative approach of base station 110 is transmitting indications of per-beam minimum communication delays in the Master Information Block (MIB) which is transmitted using a physical layer channel called the Physical Broadcast Channel (PBCH) in the downlink to endpoint devices. Endpoint devices can then pre-compensate with a corresponding minimum communication delay in NPRACH transmit timing.

When endpoint devices seek to initiate NB-IoT communications through a base station, a synchronization process first occurs, which can be hindered by large differential communication delays of the endpoint devices. An endpoint device will seek for downlink signals on designated frequencies defined by the communication network. Such signals are transmitted by a base station. Once such signals are detected by an endpoint, the endpoint will detect/decode various synchronization signaling and information. For example, a base station will present various signaling which can be detected by endpoint devices within range. This signaling includes the Narrowband Primary Synchronization Signal (NPSS) and the Narrowband Secondary Synchronization Signal (NSSS). The NPSS is used by endpoint devices to achieve synchronization with an NB-IoT base station, in both time and frequency. After an endpoint device has performed synchronization in time and frequency acquiring the NPSS, the endpoint device turns to the NSSS to detect the physical cell identity (PCID) and acquire more information about the frame structure of the cell. Then, an endpoint device detects/decodes the Narrowband Physical Broadcast Channel (NPBCH) broadcast by the base station, which is similar to the Physical Broadcast Channel (PBCH) in LTE. The NPBCH is used to deliver various network parameters, such as the NB-IoT Master Information Block (MIB), which provides information for the endpoint device to operate in the NB-IoT network. Further system information can be received from System Information Blocks (SIBs) transmitted over the Narrowband Physical Downlink Shared Channel (NPDSCH). Among these various parameters is information related to utilizing the NB-IoT physical random-access channel (PRACH), referred to as the Narrowband Physical Random-Access Channel (NPRACH). NPRACH refers to the time/frequency resource on which random-access preambles are transmitted by endpoint devices.

FIG. 2 illustrates this synchronization process which occurs prior to a random-access request phase. As mentioned above, base station 110 first has determined minimum communication delays for the cells. These minimum communication delays will be employed later. Base station 110 broadcasts various synchronization signaling for receipt by endpoint 110, which includes the NPSS, NSSS, NPBCH, and NPDSCH. Endpoint device 120 can detect this synchronization signaling and decode various parameters and information required to initiate communications with base station 110 to request communication access from base station 110.

Once the various network parameters and information have been received and decoded by endpoint device 120, the endpoint device can request to gain access to the network. To appreciate the disclosed techniques for random access through a satellite system, salient points about standard NB-IoT random access method are first described.

Figure 4:
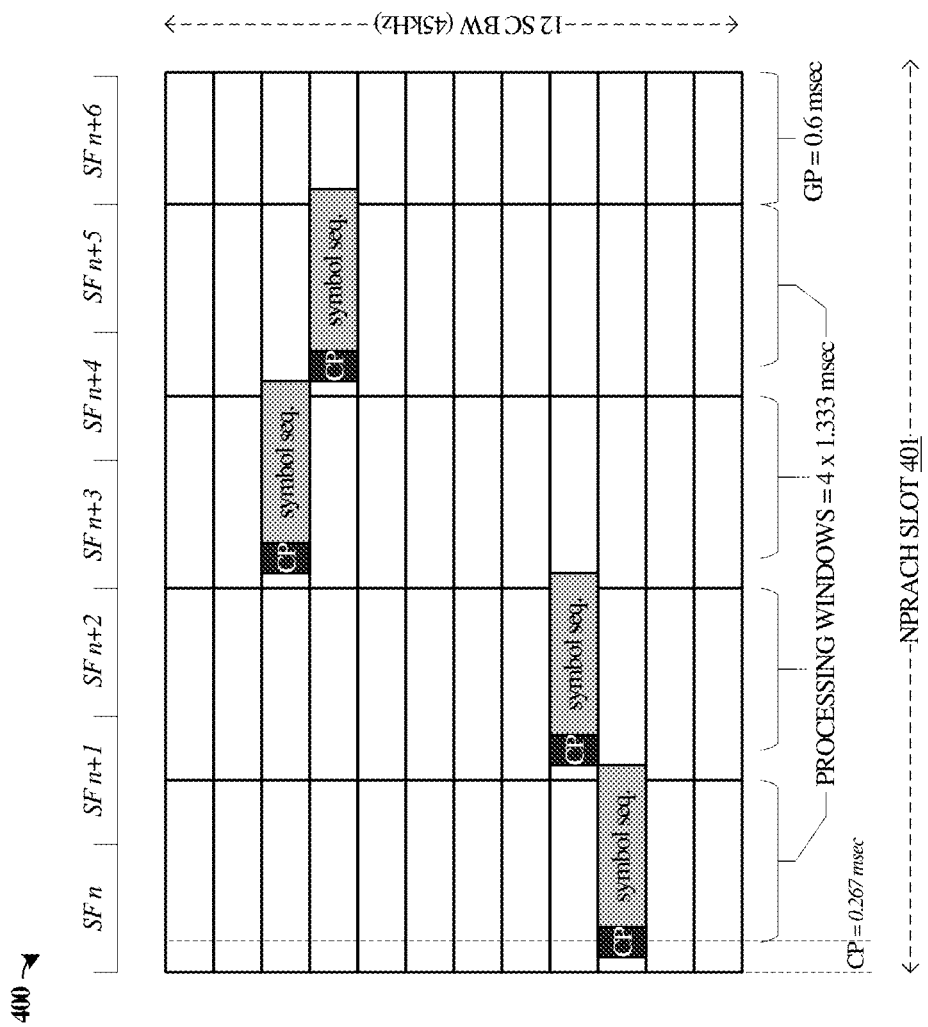
FIG. 4 illustrates preamble processing for terrestrial communications in an implementation.

In NB-IoT, an endpoint device first transmits a signal referred to as random-access preamble (or multiple preambles in succession) at the beginning of a time interval, the NPRACH slot, as indicated in system information received. Random access preambles enable a base station to determine the time delays between the endpoint devices and the cell towers of the base stations and the frequency offsets associated with these endpoint devices. Random access preamble comprises a predefined number of "symbol groups" (SGs) each is a predefined symbol sequence preceded by a cyclic prefix (CP). The number of SGs may be 4. The symbol sequence in an SG has a preset length, such as 5. Each SG is transmitted on a single tone 3.75 kHz or 1.25 kHz subcarrier at a predetermined but different frequency. Thus, the frequencies of the SGs form a deterministic hopping pattern. In one example, a frequency hopping pattern might comprise transferring a first instance of a preamble at a base frequency tone, then 1 tone up, followed by 6 tones up, and 1 tone down. Other frequency hopping patterns can be employed. A random access preamble transmitted by an endpoint device arrives at the base station with a time offset relative to the start of a NPRACH slot at the base station. This time offset is the round-trip delay between the endpoint device and the cell tower. The CP should be long enough to accommodate the timing uncertainty, that is, the round-trip delay, of any endpoint device in a cell. Towards the end of a NPRACH slot, there is a guard period (GP) that is also long enough to accommodate the maximum round-trip delay of a cell. The duration of a NPRACH slot is thus the number of SGs times the duration of SG plus GP. A NPRACH slot spans an integer quantity of subframes (SF). FIG. 4 illustrates an example of a random access preamble arriving at a base station in a NPRACH slot that is 7 subframes.

In detecting the possible arrival (i.e. presence) of a preamble with a particular frequency hopping pattern, the base station typically takes a number of samples during each of a set of NPRACH processing windows in a NPRACH slot. The number of processing windows is equal to the number of SGs in a preamble. Each processing window is for one SG and has a duration that of a symbol sequence. The processing windows are placed in time at CP interval apart as shown in FIG. 4. The samples in each processing window are taken at the frequency of the corresponding SG of the preamble to detect. For preambles with different hopping patterns, different sets of samples are taken within each processing window on frequencies matching the respective preamble hopping pattern. If the preamble to detect is transmitted by an endpoint device within the cell the NPRACH slot is configured, then all samples of a processing window capture a portion of the corresponding SG as shown in FIG. 4. The base station runs an algorithm, such as one using a Fast Fourier Transform (FFT), to process the samples for the preamble with a particular hopping pattern and produces an indication of detection, as well as an estimate of time offset and an estimate of frequency offset, both associated with the endpoint device that transmitted the preamble. From base station perspective, the time offset is called time of arrival (ToA), to mean the point in time after the beginning of a NPRACH slot, when the leading edge of a preamble arrives. The time offset equals the round-trip delay between the base station and the endpoint device. In NB-IoT, there are 12 NPRACH preambles each with an associated frequency hopping pattern, allowing 12 endpoint devices to simultaneously request access to a base station.

Now the discussion can turn to enhanced techniques for NB-IoT random access for a satellite system. In the satellite systems discussed herein, the minimum per-cell delay can be adjusted at the base station or pre-compensated at endpoint devices. If an endpoint device is situated at a location within a cell close to the location of minimum communication delay, random access preambles transmitted by the endpoint device would arrive at base station near the beginning of a NPRACH slot. However, if the endpoint device not at a location in a cell at or near the minimum communication delay, that is, the endpoint device is associated with a large differential communication delay, preambles transmitted by the endpoint device may arrive at the base station too late in time (or too far "to the right" in FIG. 4), such that the CP portion of each SG is "to the right" of the beginning of the processing window corresponding to the SG. The base station might not properly detect the random access preamble from endpoint device 120. These delays can occur when endpoint device 120 is transferring uplink signaling by way of satellite device 130 which has greater associated differential transmission delays than the protocol (e.g. NB-IoT) might support.

The initial synchronization communications (downlink) broadcast by base station 110 are typically not affected by the greater associated transmission delays, since this signaling is merely broadcast/unidirectional before any two-way communications are initiated. In contrast, a time delay ($\Delta t$) is experienced for the uplink communications that include the access preamble from endpoint device 120. This time delay can vary based on the instant location of endpoint device in the cell, and is comprised of two portions. A first portion, referred to herein as the minimum communication delay, is baselined to the minimum expected delay for the cell or beam. This first portion will be common or the same for all endpoint devices in a particular cell/beam. A second portion, referred to herein as the differential communication delay or differential propagation delay, depends on the location of the endpoint device in the cell. This second portion will typically vary for each endpoint device. In FIG. 1, an endpoint device within cell 132 might be located anywhere between $P_{near}$ and $P_{far}$, which can have an associated differential location using $P_{near}$ as a baseline location. This differential location translates to a differential communication delay, which is shown as having a maximum differential distance projected onto a communication link delay or distance (or beam distance) that might form cell 132. Similar concepts apply to other cells, such as cell 131.

Figure 3:
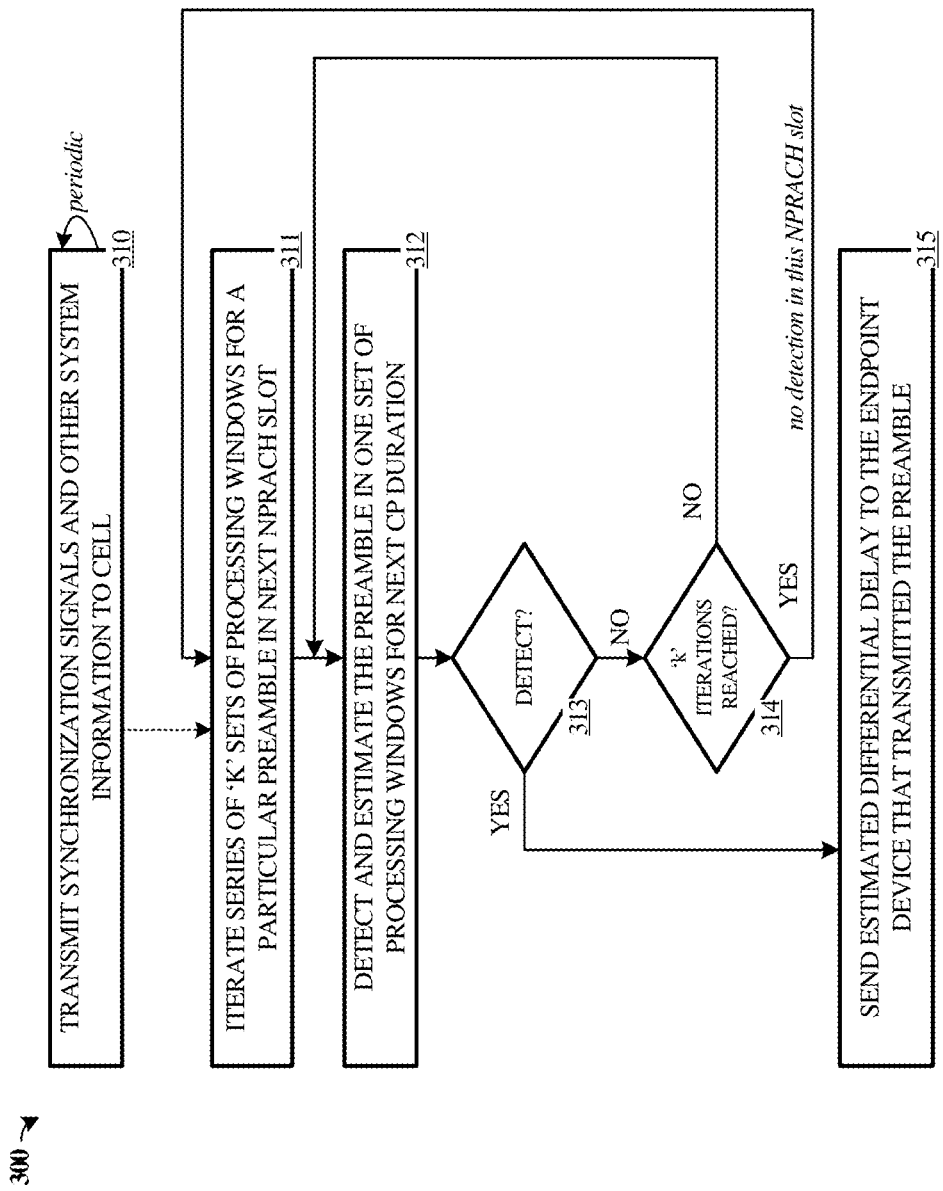
FIG. 3 illustrates an example preamble detection and estimation process for a communication system in an implementation.
Figure 5:
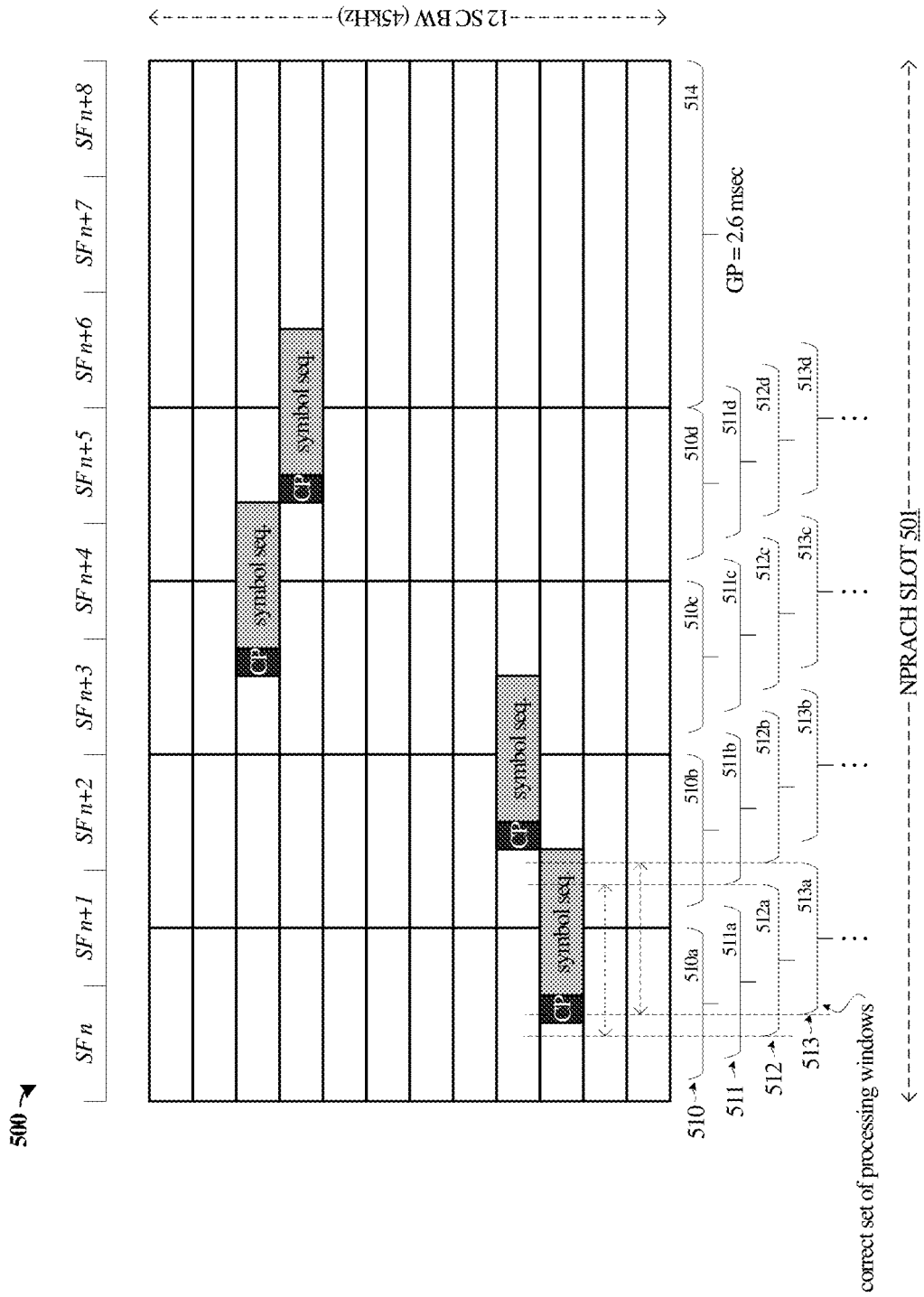
FIG. 5 illustrates preamble processing for satellite-transported communications in an implementation.

To ensure detection of random access preambles transmitted by endpoint device 120 during the NPRACH slot, base station 110 employs enhanced NPRACH detection/estimation techniques. First, the NPRACH slot for each cell is extended in duration with a longer guard period (GP) to accommodate the maximum differential communication delay of the cell. A random access preamble transmitted from an endpoint device at the location in cell with maximum differential communication delay should still arrive at the base station wholly inside the NPRACH slot. FIG. 5 illustrates an example of such a NPRACH slot that has a longer GP than standard NB-IoT. As mentioned above, a set of processing windows are normally used during the NPRACH slot to detect access preambles. However, these processing windows can fail to detect access preambles when large differential time delays ($\Delta t$) lead to significant late arrival of in random access preamble at the base station. FIG. 3 shows an iterative detection technique which applies a succession of sets of processing windows, each succession shifted in time from a previous iteration by a CP duration. Base station 110 iterates an NPRACH preamble detection and estimation algorithm for standard NB-IoT over the series of sets of processing windows, until a $K^{th}$ set that yields a detection of an access preamble. The ToA calculation can then be $(K-1)*CP$ added to the estimated ToA delay from the $K^{th}$ set of processing windows. This iterative approach assures that random access preambles arriving after the first CP duration (from the start of the NPRACH slot) will be detected and the large differential delays correctly estimated. A preamble only fully occupies one set of processing windows in time and at the correct hopping frequency associated with each window, and it is in this set of processing windows does the corresponding iteration of the native NPRACH preamble detection and estimation algorithm for standard NB-IoT detect the preamble. In any other set of processing windows, the preamble either does not fully occupy the processing windows in time or is not at the correct hopping frequencies associated with those windows, and the iteration of the native NPRACH preamble detection and estimation algorithm for standard NB-IoT corresponding to that set of processing windows will not yield a detection.

Once base station 110 determines ToA and frequency offsets associated with the endpoint device 120, base station 110 transmits to endpoint device 120 a Random-Access Response (RAR) that indicates ToA as well as resource allocation information for resources from which endpoint device 120 can request network access via the Narrowband Physical Uplink Shared Channel (NPUSCH). Endpoint device 120 can then transmit the Radio Resource Control (RRC) Connection Request, adjusting transmission time by the received ToA, to further carry the network access process forward until granted resources from which data transfer can occur with base station 110. With endpoint device 120 transmitted messages arriving at correct timing, base station 110 can successfully demodulate/decode the messages, even when endpoint device communications are transported over long-delay links corresponding to satellite device 130. Access grant messaging can be eventually transferred by base station 110 which instructs endpoint device 120 of various communication resources that can be employed to transmit or exchange data for a period of time, referred to in FIG. 2 as a data session.

FIG. 3 is presented to further illustrate an example operation that uses an iterated technique for detection of access preambles transmitted by endpoint devices. The operations of FIG. 3 are provided in the context of elements of FIG. 1 for clarity. In operation 310, base station 110 periodically transmits synchronization signals and other system information to endpoint devices via link 140. Satellite device 130 receives these synchronization and system information signals and retransmits them in beams 141-142 that form cells 131-132. Endpoint devices within cells 131-132 can detect the synchronization signals and seek to establish communications with base station 110. For example, endpoint device 120 might detect and synchronize to the synchronization signals of cell 131, retrieving system information, and then transmit an access preamble to base station 110 by way of satellite device 130. This access preamble typically reaches base station 110 inside an NPRACH slot with a time offset larger than CP due to the length of links 140 and 141. Thus, base station 110 might not detect the preamble from endpoint device 120 using conventional detection and estimation techniques, and further access/sync signaling will not be transferred to endpoint device 120 for establishment of network access.

However, base station 110 employs an enhanced preamble detection technique. In this enhanced preamble detection technique, base station 110 delays its own reception timing for a cell by the minimum delay of the cell. Thus, the random access preamble transmitted by an endpoint device 120 in the cell at a location closest to satellite 130 arrives at base station 110 in a PRACH slot at the beginning of the slot. But the random access preamble transmitted by an endpoint 120 elsewhere in the cell may arrive at base station 110 in a NPRACH slot with time offset larger than CP duration from the beginning of the slot. In operation 311, base station 110 iterates several sets of processing windows, with each set delayed from the prior set by an inter-set delay. The first set of processing windows begins at CP time after the beginning of the NPRACH slot. This set of processing windows can detect preambles transmitted by any endpoint device within cell 131 that has a round-trip differential delay between 0 and CP. This first set of processing windows is similar to the set of processing windows utilized in conventional NB-IoT base station. The inter-sequence delay corresponds to the CP duration in the examples herein, although other delays can be employed. Thus, a successive set of processing windows are employed over iterations (operation 312), where the $K^{th}$ set of processing windows, K=1, 2, . . . , k, is for the $K^{th}$ iteration of the native NPRACH preamble detection and estimation algorithm for standard NB-IoT, to detect preambles with round-trip differential delay between (K−1)*CP and K*CP. If a detection is obtained in a $K^{th}$ set of processing windows (operation 313), then base station 110 sends estimate of total round-trip delay to endpoint device 120 in the Random Access Response (RAR) message (operation 315), to further the network access signaling network access procedure. If 'k' iterations have not been reached (operation 314), then the next set of processing windows, delayed from the previous sequence by the CP duration, is used. If 'k' iterations have been reached and no detection is found, then base station 110 moves on to attempt to detect preambles in a new NPRACH slot scheduled for a future time. Note that FIG. 3 illustrates only the logically serial execution of a native NPRACH preamble detection and estimation algorithm for standard NB-IoT among the different sets of processing windows, from one to next. In some implementations, the execution of the native NPRACH preamble detection and estimation algorithm for standard NB-IoT can be parallel among the different set of processing windows.

In addition to the above operations, per-beam minimum communication delays that correspond to the cells (for each beam) may vary over time, such as due to satellite orbital motion and the desire for fixed beam locations on the terrestrial surface. Thus, base station 110 can periodically make adjustments to compensate for changes in communication beams with respect to the terrestrial surface due to orbital movement of the satellite devices, among other factors. These adjustments can comprise adjustments to reception frames and subframes, including NPRACH slots, for a cell to the minimum communication delay of that cell.

FIG. 4 illustrates example operations for conventional detection of preamble communications transferred by endpoint devices. FIG. 4 illustrates NPRACH configuration 400 which spans several subframes (SF), for example, from $SF_n$ to $SF_{n+6}$. The quantity of subframes in a corresponding NPRACH slot 401 depends on the NPRACH format selected, which can include formats 0, 1, and 2 as defined by NB-IoT protocol standards. Format 1 is illustrated in FIG. 4 for exemplary purposes, and has a subcarrier bandwidth of 3.75 kHz, a CP duration of 0.267 milliseconds (msec), an SG duration of 1.333 msec, a quantity of four SGs, a guard period (GP) duration of 0.6 msec, a quantity of seven subframes, and a maximum timing uncertainty of 0.267 msec which corresponds to a maximum cell radius of 40 kilometers (km).

An access preamble of 4 Symbol Groups (SGs) is transmitted in a predefined frequency hopping pattern by an endpoint device over the NPRACH. In NB-IoT, the NPRACH can include 12 preambles each with an associated frequency hopping pattern, allowing 12 endpoint devices to simultaneously request access to a base station, although only one such endpoint device is shown in FIG. 4. Thus, there are 12 preambles each with own hopping pattern, allowing 12 UEs to simultaneously acquire into system, and the base station processes all preambles present in same NPRACH slot 401. If no delays were encountered for communications between base stations and endpoint devices, access preambles would arrive at the base station without greater-than-zero time offsets relative to the start of the NPRACH slot.

However, in realistic scenarios, preambles arrive with a greater-than-zero time offset relative to start of the NPRACH slot due to communication delays related to distance between the base station and endpoint devices. As noted above, for format 1, a maximum timing uncertainty of 0.267 msec is allowed to successfully detect the access preambles. This is reflected by the CP time duration of 0.267 msec which precedes each SG of a preamble. Each processing window is configured to potentially detect a different SG among the four SGs that comprise the access preamble. A guard period (GP) is included after the last processing window to ensure that any final or late-arriving SGs do not experience collision with subsequent NPRACH slots or subframes for other communications.

The base station can detect a preamble comprising of SGs in the various processing windows. If a complete set of SGs is correctly detected, then the base station can determine that an endpoint device is requesting access and initiate further access communications with that endpoint device. From the delays with regard to the start of NPRACH slot, the base station can estimate ToA and frequency errors. Thus, FIG. 4 describes a random-access procedure for a base station to receive access preamble communications from endpoint devices. However, as noted above, the maximum cell size is defined in part by the maximum timing uncertainty of 0.267 msec, which also corresponds to a maximum cell radius of 40 km. In examples where the communications are carried over satellite links or satellite devices, link delays can far exceed such maximum timing uncertainties. SGs of access preambles arrive at base stations with much larger time offsets relative to start of a NPRACH slot due to differential communication delays, even with minimum delay accounted for by base station 110 as shown in FIG. 3B. This can lead to failure to detect endpoint devices attempting to transmit access preambles, and thus failure of endpoint devices to attach to a corresponding communication network.

FIG. 5 illustrates operations for enhanced detection and estimation of preamble communications transferred by endpoint devices over satellite links or other delayed links. FIG. 5 illustrates NPRACH slot configuration 500 which spans several subframes (SF), for example, from $SF_n$ to $SF_{n+8}$. The quantity of subframes in a corresponding NPRACH slot 501 depends on the NPRACH format selected, which can include enhanced formats than included in the NB-IoT protocol standard. The configuration of FIG. 5 is merely exemplary and other examples may include different enhanced formats. Some example enhanced formats are included in FIG. 6. A detection and estimation algorithm similar to that for a single set of processing windows, i.e. FIG. 4, is employed in FIG. 5. However, FIG. 5 also includes an outer loop comprising an iterative process that employs several iterative or successive sets of processing windows. FIG. 5 shows these successive sets as 510-513, each with four corresponding processing windows (a, b, c, d). An example CP duration of 0.267 milliseconds (msec) is still employed in FIG. 5, with an SG duration of 1.333 msec, and a quantity of four SGs for the access preamble. An extended guard period (GP) duration of 2.6 msec and a quantity of nine (SF n=9) subframes are employed in NPRACH slot 501.

An access preamble of 4 SGs is transmitted in a pre-defined frequency hopping pattern by an endpoint device over the NPRACH. However, in satellite scenarios, SGs arrive with a large time offset relative to start of the NPRACH slot due to transmission delays related to link propagation delays experienced over satellite links between the base station and endpoint devices. As noted above, for terrestrial format 1, a maximum timing uncertainty of 0.267 msec can be encountered to successfully detect the access preambles. However, this timeframe is too short for the corresponding minimum communication delays and differential communication delays encountered in satellite-carried signaling, such as seen in FIG. 1. Thus, the enhanced detection process in FIG. 5 employs multiple successive sets of processing windows 510-513, each set is successively shifted from a previous series of processing windows by a CP duration (e.g. 0.267 msec). Each successive set of processing windows includes four processing windows (a, b, c, d) in FIG. 5, and each processing window has a duration of 1.333 msec. Other processing window durations and shifts can be employed. In addition, the extended GT=2.6 msec, which is sufficient for maximum expected differential communication delays (for a particular beam or cell) and for NPRACH slot 501 to comprise an integer number of subframes. The quantity of successive sets of processing windows can be calculated by:

$$\text{\# Sets of Processing Windows } k = \left\lceil \frac{\text{GP duration}}{\text{CP duration}} \right\rceil.$$

The enhanced detection process highlighted in FIG. 5 includes taking samples of the NPRACH preamble SGs within each processing window 510-513 at the subcarrier frequency of the corresponding SG to determine if the samples indicate that any of the successive sets of processing windows is the correct set. Incorrect sets of processing windows will not detect SGs, while correct a set of processing windows will detect SGs. In FIG. 5, sets 510-512 are not the correct set for this particular access preamble, but set 513 is the correct set. Thus, processing windows 513a, 513b, 513c, and 513d detect SGs that comprise the access preamble. For an access preamble of interest, only one set of processing windows will see the preamble fully and each SG on correct subcarrier frequency. Any other set of processing windows will observe combinations of three possibilities. A first possibility is that the leading 'n' windows (n=1, 2, 3, and 4) do not see the expected symbol group in full. A second possibility is that the ending 'n' windows (n=1, 2, 3, and 4) do not see the expected symbol group in full. A third possibility is that a window sees portions of two symbol groups on different subcarriers. For this third possibility, for the expected subcarrier frequency, only a portion of expected symbol group is detected (similar to the first and second cases).

Once the correct iteration/set of processing windows (e.g. 513 a-d) are determined, the base station estimates ToA and frequency error from samples of the processing windows of the set/iteration. This process is similar to the terrestrial NPRACH estimation algorithm. Also, if 'K' is the quantity of successive sets/iterations of processing windows prior to the correct set/iteration, then the base station adds K*(CP duration) to the estimated ToA from the K+1$^{st}$ set of processing windows.

The described enhanced detection algorithm also works on NPRACH configurations with repetition. NB-IoT may use repetition in NPRACH transmission to improve robustness $-2^r$ preambles are transmitted consecutively. Single preamble processing may be repeated and combined to improve detection and estimation performance, which can also be applied in satellite arrangements. For example, an NPRACH configuration might employ a 2-repetition NPRACH. In this case, a terrestrial base station would deploy one set of eight processing windows, the first four windows detecting the first preamble and the second four windows detecting the second preamble. Similar to that of FIG. 5, for over-satellite links, base station 110 may deploy a number of sets of processing windows, each set consisting of eight processing windows. Base station 110 may iterate the terrestrial NPRACH detection and estimation algorithm for standard NB-IoT in each set of eight processing windows. For each iteration, the detection and estimation algorithm is used first in the first four processing windows to detect the first preamble and then in the second four processing windows to detect the second preamble. Different guard periods might be employed for 2-repetition configurations, such as the entire NPRACH slot is an integer number of subframes, for example, 16 subframes with GP=3.2 msec. However, it should be understood that the 'repetition' of preambles in NPRACH transmission is entirely different than that of the iterative or successive sets of processing windows discussed herein.

FIG. 6 illustrates example random access preamble format parameters for satellite-transported communication configurations. FIG. 6 includes table 610 that comprises example NB-IoT NPRACH preamble formats and parameters for use over satellite systems, with all durations and delays in msec. In table 610, a variety of formats are included in an (X-Y-Z) notation. This notation corresponds to (standard NB-IoT NPRACH format, repetitions, NPRACH slot duration). As can be seen in table 610, much greater transmission delays, cell sizes, and other delay-related parameters can be tolerated by a corresponding base station that employs such formats. Preamble repetitions are also supported in certain formats. This selection of formats is a tradeoff between spectral resource usage (overhead) and base station processing power, usually choosing the lowest spectral resource usage.

For a GEO satellite system with spot beams, Format "1-Y-Z" may be used. For example, a cell formed on the terrestrial surface by a satellite beam with a 1-degree beam size transmitted from a satellite communications device in GEO might have a differential distance variation across the cell of 1800 km, which far exceeds the 120 km size of cells supported by the terrestrial NB-IoT protocol. Table 620 illustrates example sizes for a GEO satellite spot beam fully on the terrestrial surface, where the maximum in-beam differential communication delay is a function of beam size. For such beams with northern tip on earth at 70 deg north latitude, table 620 illustrates example cell sizes. Thus, a maximum expected differential communication delay might be 6 msec, which is greater than that of the terrestrial NB-IoT protocol. For example, the format-2 of the terrestrial NB-IoT protocol supports a maximum differential communication delay of 0.8 msec and a maximum cell radius of 120 km, approximately factor of 10 smaller than the satellite NB-IoT techniques discussed herein.

Per-beam minimum communication delays that correspond to the cells (for each beam) may vary over time due to satellite orbital motion and the desire for fixed beam location on the terrestrial surface. Thus, a base station can update minimum communication delays (per-beam) periodically to compensate for changes in communication beams with respect to the terrestrial surface due to orbital movement of the satellite devices.

Figure 7:
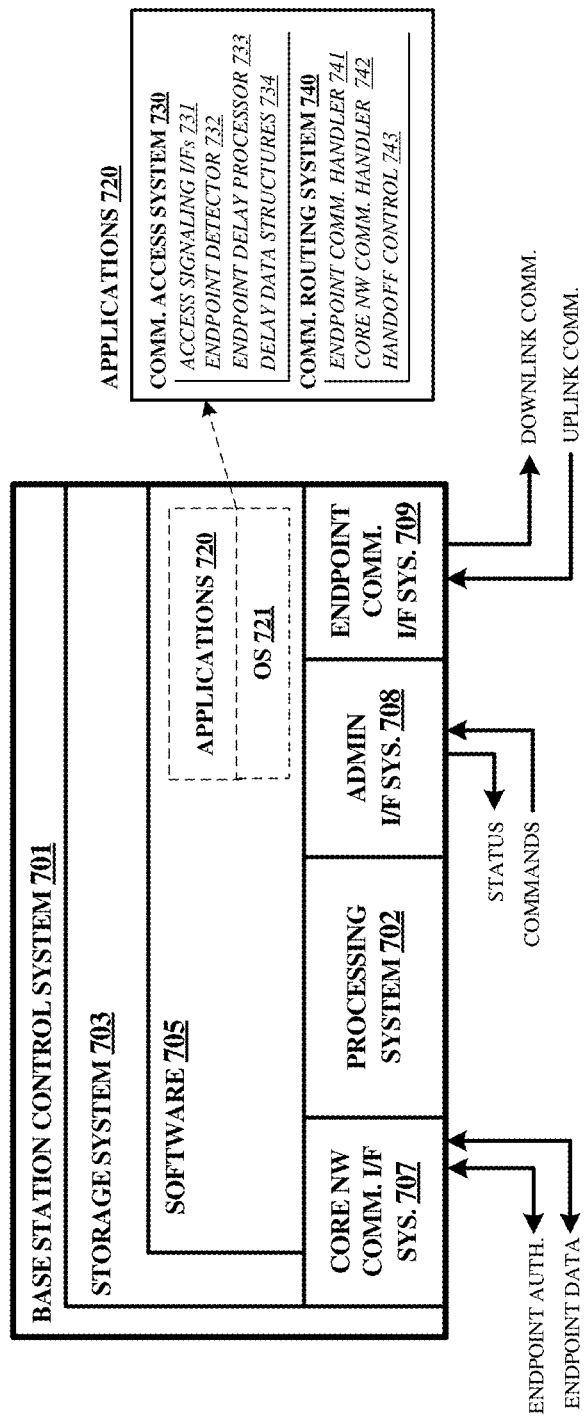
FIG. 7 illustrates a base station and control software in an implementation.

FIG. 7 illustrates base station control system 700 and associated software 705 in an implementation. FIG. 7 illustrates control system 701 that is representative of any system or collection of systems in which the various operational architectures, scenarios, and processes disclosed herein may be implemented. For example, control system 701 can be used to implement elements of base station 110 of FIG. 1. Control system 701 might implement controllers for any of the circuitry, elements, modules, systems, apparatuses, and the like discussed herein.

Control system 701 may be implemented as a single apparatus, system, or device or may be implemented in a distributed manner as multiple apparatuses, systems, or devices. Control system 701 includes, but is not limited to, processing system 702, storage system 703, software 705, core network communication interface system 707, administrative interface system 708, and endpoint device communication interface system 709. Processing system 702 is operatively coupled with storage system 703, core network communication interface system 707, administrative interface system 708, and endpoint device communication interface system 709.

Processing system 702 loads and executes software 705 from storage system 703. Software 705 includes applications 720 comprising communication access system 730 and communication routing system 740, which are representative of the processes, services, controls, and platforms discussed with respect to the included Figures. When executed by processing system 702 to provide access to endpoint devices for communication services of a cellular communication network, among other services, software 705 directs processing system 702 to operate as described herein for at least the various processes, operational scenarios, and sequences discussed in the foregoing implementations. Control system 701 may optionally include additional devices, features, or functionality not discussed for purposes of brevity.

Referring still to FIG. 7, processing system 702 may comprise a microprocessor and processing circuitry that retrieves and executes software 705 from storage system 703. Processing system 702 may be implemented within a single processing device, but may also be distributed across multiple processing devices or sub-systems that cooperate in executing program instructions. Examples of processing system 702 include general purpose central processing units, baseband processors, signal processors, FFT processors, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. In addition to computer readable storage media, in some implementations storage system 703 may also include computer readable communication media over which at least some of software 705 may be communicated internally or externally. Storage system 703 may be implemented as a single storage device, but may also be implemented across multiple storage devices or sub-systems co-located or distributed relative to each other. Storage system 703 may comprise additional elements, such as a controller, capable of communicating with processing system 702 or possibly other systems.

Software 705 may be implemented in program instructions and among other functions may, when executed by processing system 702, direct processing system 702 to operate as described with respect to the various operational scenarios, sequences, and processes illustrated herein. For example, software 705 may include program instructions comprising applications 720 and operating system 721 that provide access to endpoint devices for communication services of a cellular communication network, among other services. In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software or other application software, in addition to or that of elements 730 and 740. Software 705 may also comprise firmware or some other form of machine-readable processing instructions executable by processing system 702.

Software 705, when loaded into processing system 702 and executed, may transform a suitable apparatus, system, or device (of which control system 701 is representative) overall from a general-purpose computing system into a special-purpose computing system customized to provide access to endpoint devices for communication services of a cellular communication network, among other services. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors. For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Applications 720 can include communication access system 730 and communication routing system 740. Communication access system 730 includes access signaling interface 731, endpoint detector 732, endpoint delay processor 733, and delay data structures 734. Communication routing system 740 includes endpoint communications handler 741, core network communications handler 742, and handoff control 743.

Access signaling interface 731 provides random access slots for endpoint devices to request access to resources of the base station or core network of a cellular communication system. Access signaling interface 731 can establish random access slots comprising a narrowband physical random-access channel (NPRACH) window for a narrowband internet of things (NB-IoT) protocol. Endpoint detector 732 detects access preamble communications transferred by endpoint devices during random access slots, such as during NPRACH slots, by at least applying a selected quantity of successive sets of processing windows, with each of the successive sets shifted in time by a selected duration. Endpoint delay processor 733 determines a differential communication delay for the endpoint devices based on which of the successive sets corresponds to detection of symbol groups of the access preamble communications. Endpoint delay processor 733 determines correct sets and incorrect sets of processing windows to detects symbol groups of access preamble communications transferred by endpoint devices. Based on correct sets of processing windows, endpoint delay processor 733 calculates estimated ToAs corresponding to endpoint devices. Endpoint delay processor 733 can update minimum communication delays periodically to compensate for changes in communication beams with respect to a terrestrial surface due to orbital movement of orbital satellite devices. Delay data structures 734 is used to store indications of minimum communication delays and differential communication delays. Minimum communication delays can be stored in relation to cell identifiers or beam identifiers. Differential communication delays can be stored in relation to endpoint device identifiers. Delay data structures 734 can be updated according to changes in the minimum communication delays and differential communication delays.

Endpoint communications handler 741 provides communication coverage for at least an endpoint device within a coverage cell. Endpoint communications handler 741 might transport one or more signals of the coverage cell over one or more satellite devices. This signaling provided to a satellite device might include various control signaling to instruct the satellite device regarding beamforming, aiming parameters for beams, cell geographic descriptors, frequency shifting configurations, and other various information used by a satellite device to form various cells on a terrestrial surface for endpoint devices to access communication services. Endpoint communications handler 741 can receive communications that are transported over one or more satellite devices which originate from terrestrial endpoint devices. Endpoint communications handler 741 also handles return communications transferred by the endpoint devices, based at least on a combination of the minimum communication delay and the differential communication delay. Core network communications handler 742 transports communications related to endpoint devices to various elements of core network of a cellular communication network. These communications might comprise communications of the endpoint devices themselves. These communications might comprise communications for authentication, authorization, and accounting (AAA) of endpoint devices, other various access control and traffic routing, or for coordinating handoffs of endpoint devices from one base station to another or from one network to another. Handoff control 743 can work with core network communications handler 742 to coordinate and control handoff of handover of endpoint devices to other cells, beams, networks, active communication protocols, and access configurations.

Core network communication interface system 707 may include communication connections and devices that allow for communication with other data systems, communication networks, components of a core network of a cellular communication system, the Internet, or other elements and components (not shown) over communication links or communication networks (not shown). Core network communication interface system 707 may include transceivers, network interface controllers, antennas, power amplifiers, RF circuitry, traffic routers, switches, gateways, packet inspection systems, and other communication circuitry. Core network communication interface system 707 may communicate over communication media, such as metal, glass, air, or any other suitable communication media, to exchange communications with other computing systems or networks of systems. Physical or logical elements of core network communication interface system 707 can receive communications from a core network, such as core network 150 of FIG. 1, and distribute the communications to one or more endpoint devices via endpoint device communication interface system 709. Likewise, core network communication interface system 707 can receive communications received over endpoint device communication interface system 709 and route the communications to external systems, other base stations, or core elements of a cellular communication network. Core network communication interface system 707 may include portions of endpoint device communication interface system 709.

Communication between control system 701 and other elements or systems via core network communication interface system 707 may occur over communication links or communication networks and in accordance with various communication protocols, combinations of protocols, or variations thereof. For example, core network communication interface system 707 might communicate over corresponding digital communication links comprising packet network interfaces, Ethernet interfaces, serial interfaces, or wireless interfaces. When network links are employed, examples networks include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some network communication protocols that may be used include, but are not limited to, the Ethernet, Internet protocol (IP, IPv4, IPv7, etc . . . ), the transmission control protocol (TCP), and the user datagram protocol (UDP), as well as any other suitable communication protocol, variation, or combination thereof.

Endpoint device communication interface system 709 comprises various hardware and software elements for interfacing with endpoint devices over RF downlinks and uplinks. Endpoint device communication interface system 709 can include transceiver circuitry, RF modulation circuitry, RF amplifiers, antennas, antenna arrays, beamforming equipment, or other circuitry and equipment which provide for communication with endpoint devices over a plurality of cells established with a plurality of signal beams. Analog-to-digital conversion circuitry, digital-to-analog conversion circuitry, filtering circuitry, data processing elements, baseband processors, or other equipment can also be included in endpoint device communication interface system 709. Endpoint device communication interface system 709 can establish one or more signal beams for creation of one or more cellular coverage areas. Endpoint device communication interface system 709 can employ various communication protocols and standards. These protocols define physical layers that encompass transmitter and receiver aspects of wireless links, such as link establishment and maintenance over a particular transmission medium. The physical layer can include various frequency and bandwidth arrangements as well as carrier multiplexing, bit-level encoding, and beamforming. The enhanced techniques discussed herein are in the context of Narrow Band Internet-of-Things (NB-IoT) protocols. However, it should be understood that other wireless protocols can be employed, some of which include Long-Term Evolution (LTE), 5G New Radio (5G), and enhanced Machine Type Communication (eMTC), LTE-M, NR-RedCap, among others, which employ radio frequency (RF) links.

Although endpoint device communication interface system 709 can communicate with various terrestrial endpoint devices, associated communications might be transported over one or more satellite devices. Thus, endpoint device communication interface system 709 can include equipment and circuitry to communicate with one or more satellite devices in orbit. Some implementations of endpoint device communication interface system 709 provide downlink portions of wireless links for endpoint devices that may utilize a different carrier configuration to communicate with a satellite device, and the satellite device performs one or more transponder operations to alter the carrier configuration to be compatible with a downlink configuration expected by endpoint devices. For example, the downlink portion of an RF link can employ a frequency range corresponding to the IEEE bands of S band, L band, C band, X band, Ku band, Ka band, V band, W band, among others, including combinations thereof. Other example RF frequency ranges and service types include UHF, SHF, EHF, or other parameters defined by different organizations. Alternatively, endpoint device communication interface system 709 can utilize optical communications to communicate with satellite devices, and these optical communications typically include optically-relevant carrier frequencies and modulations according to various optical communication standards. In optical communication examples, endpoint device communication interface system 709 and the satellite devices may translate or transform the optical signaling to RF signaling and vice-versa.

Administrative interface system 708 may be optionally included, and comprise a software or virtual interface such as a terminal interface, command line interface, or application programming interface (API). Administrative interface system 708 may also include physical user interfaces, such as keyboard, a mouse, a voice input device, or a touchscreen input device for receiving input from a user during manufacturing or active operations. Output devices such as a display interfaces, audio interfaces, web interfaces, terminal interfaces, and other types of output devices may also be included in administrative interface system 708. Administrative interface system 708 can provide output and receive input over a network interface, such as core network communication interface system 707. In network examples, administrative interface system 708 might packetize data for receipt by a display system or computing system coupled over one or more network interfaces. Administrative interface system 708 may comprise API elements for interfacing with users, other data systems, other user devices, web interfaces, and the like. Administrative interface system 708 may also include associated user interface software executable by processing system 702 in support of the various user input and output discussed above. Separately or in conjunction with each other and other hardware and software elements, the user interface software and user interface devices may support a console user interface, graphical user interface, a natural user interface, or any other type of user interface.

It should be appreciated that the disclosed techniques apply to communications systems employing non-geosynchronous orbit (NGSO) satellites, such as low-earth orbit (LEO), medium earth orbit (GEO), and highly elliptical orbit (HEO), in addition to geosynchronous (GEO or GSO), among other orbital configurations of satellites. The disclosed techniques also apply to regenerative satellites for which base stations or portions of base stations operate onboard the satellites (as opposed to operating on the ground). In the case of regenerative satellites with partial base station elements onboard that perform, the per-cell minimum communication delay is the propagation delay between the satellite casting the cell and the location in the cell that is closest to the satellite.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A method comprising:
providing communication coverage for at least an endpoint device within a cell serviced by a base station;
detecting random access preamble communications transferred by the endpoint device during a random access slot of the base station by at least applying a selected quantity of successive sets of processing windows in accordance with a round-trip minimum communication delay expected between the base station and the cell, with each of the successive sets shifted in time by a selected duration;
determining a round-trip differential communication delay for the endpoint device based on which set among the successive sets corresponds to detection of symbol groups of the random access preamble communications; and handling return communications transferred by the endpoint device based at least on a combination of the round-trip minimum communication delay and the round-trip differential communication delay.

2. The method of claim 1, wherein the round-trip minimum communication delay between the base station and the cell exceeds a cyclic prefix (CP) duration of a narrowband internet of things (NB-IoT) communication protocol employed over the communication link, wherein the successive sets are successively shifted in time in units of the CP duration.

3. The method of claim 1, wherein the random access slot comprises a narrowband physical random access channel (NPRACH) slot, and wherein the random access preamble communications comprise NPRACH preamble communications for a narrowband internet of things (NB-IoT) protocol.

4. The method of claim 1, further comprising:
extending a guard period (GP) of the random access slot to accommodate at least a maximum expected round-trip differential communication delay associated with the cell.

5. The method of claim 1, wherein each of the successive sets of processing windows comprises a plurality of processing windows configured to detect symbol groups of the access preamble communications by at least taking samples of subcarriers at frequencies matching the hopping pattern of the symbol groups.

6. The method of claim 5, further comprising:
determining a correct set of processing windows that detects the symbol groups of the random access preamble communications by at least identifying which of the successive sets of processing windows detects each of the symbol groups in full on a particular subcarrier hopping pattern; and
determining an incorrect set of processing windows by at least identifying which of the successive sets of processing windows only partially capture the intended symbol groups on the intended subcarriers.

7. The method of claim 1, further comprising:
based on the correct set of processing window, calculating an estimated time of arrival (ToA) corresponding to the endpoint device; and
determining the round-trip differential communication delay by at least adding a quantity of successive sets of processing windows that precede the correct set of processing windows multiplied by the selected duration to the ToA.

8. The method of claim 1, wherein the communication link is transported over at least one orbital satellite device, and wherein the orbital satellite device directs at least one communication beam comprising the communication link towards a terrestrial surface to establish the cell.

9. The method of claim 8, further comprising:
updating the round-trip minimum communication delay periodically to compensate for changes in the at least one communication beam with respect to the terrestrial surface due to orbital movement of the at least one orbital satellite device.

10. A base station for a cellular communication system, comprising:
a transceiver configured to provide communication coverage for at least an endpoint device within a cell;
a processor configured to detect random access preamble communications transferred by the endpoint device during a random access slot of the base station by at least applying a selected quantity of successive sets of processing windows in accordance with a round-trip minimum communication delay expected between the base station and the cell, with each of the successive sets shifted in time by a selected duration;
the processor configured to determine a round-trip differential communication delay for the endpoint device based on which of the successive sets corresponds to detection of symbol groups of the access preamble communications; and
the transceiver configured to handle return communications transferred by the endpoint device based at least on a combination of the round-trip minimum communication delay and the round-trip differential communication delay.

11. The base station of claim 10, wherein the round-trip differential communication delay between the base station and the cell exceeds a cyclic prefix (CP) duration of a narrowband internet of things (NB-IoT) communication protocol employed over the communication link, wherein a series of processing window sets are successively shifted in time in units of the CP duration.

12. The base station of claim 10, wherein the random access slot comprises a narrowband physical random-access channel (NPRACH) slot, and wherein the random access preamble communications comprise NPRACH preamble communications for a narrowband internet of things (NB-IoT) protocol.

13. The base station of claim 10, further comprising:
the processor configured to extend a guard period (GP) of the random access slot to accommodate at least a maximum expected round-trip differential communication delay associated with the cell.

14. The base station of claim 10, wherein each of the successive sets of processing windows comprises a plurality of processing windows configured to detect symbol groups of the access preamble communications by at least taking samples of subcarriers at frequencies matching the hopping pattern of the symbol groups.

15. The base station of claim 14, further comprising:
the processor configured to determine a correct set of processing windows that captures the symbol groups of the access preamble communications by at least identifying which of the successive sets of processing windows is fully occupied by the symbol groups on the particular subcarriers matching the hopping pattern of the symbol groups; and
the processor configured to determine an incorrect set of processing windows by at least identifying which of the successive sets of processing windows is only partially occupied by the symbol groups on the particular subcarriers matching the hopping pattern of symbol groups.

16. The base station of claim 10, further comprising:
based on the correct set of processing windows, the processor configured to calculate an estimated time of arrival (ToA) corresponding to the endpoint device; and
the processor configured to determine the round-trip differential communication delay by at least adding a quantity of successive sets of processing windows that precede the correct set of processing windows multiplied by the selected duration to the ToA.

17. The base station of claim 10, wherein the communication link is transported over at least one orbital satellite device, and wherein the orbital satellite device directs at least one communication beam comprising the communication link towards a terrestrial surface to establish the cell.

18. The base station of claim 17, further comprising:
the processor configured to update the round-trip minimum communication delay periodically to compensate for changes in the at least one communication beam with respect to the terrestrial surface due to orbital movement of the at least one orbital satellite device.

19. An apparatus, comprising:
one or more computer readable storage media;
a processing system operatively coupled with the one or more computer readable storage media; and
program instructions stored on the one or more computer readable storage media that, based on being read and executed by the processing system, direct the processing system to at least:
provide communication coverage for at least an endpoint device within a cell corresponding to a base station;
detect random access preamble communications transferred by the endpoint device during a random access slot of the base station by at least applying a selected quantity of successive sets of processing windows in accordance with a round-trip minimum communication delay expected between the base station and the cell, with each of the successive sets shifted in time by a selected duration; and
determine a round-trip differential communication delay for the endpoint device based on which of the successive sets corresponds to detection of symbol groups of the access preamble communications.

20. The apparatus of claim 19, wherein each of the successive sets of processing windows comprises a plurality of processing windows configured to detect symbol groups of the access preamble communications by at least taking samples of subcarriers at frequencies matching those of the symbol groups to detect; and
comprising further program instructions, based on being executed by the processing system, direct the processing system to at least:
determine a correct set of processing windows that detects the symbol groups of the access preamble communications by at least identifying which of the successive sets of processing windows is fully occupied by the symbol groups to detect, on subcarrier frequencies matching those of the symbol groups; and
determine an incorrect set of processing windows by at least identifying which of the successive sets of processing windows is only partially occupied by the symbol groups to detect on subcarrier frequencies matching those of the symbol groups.

* * * * *